United States Patent
Silver

(10) Patent No.: US 10,532,747 B2
(45) Date of Patent: Jan. 14, 2020

(54) SYSTEM AND METHOD FOR AUTOMATIC DETECTION OF IMPLEMENT WORKING WIDTH

(71) Applicant: DEERE & COMPANY, Moline, IL (US)

(72) Inventor: Nathaniel V. Silver, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 105 days.

(21) Appl. No.: 15/830,350

(22) Filed: Dec. 4, 2017

(65) Prior Publication Data

US 2019/0168768 A1 Jun. 6, 2019

(51) Int. Cl.
| | |
|---|---|
| *B60W 40/12* | (2012.01) |
| *A01B 69/08* | (2006.01) |
| *A01B 79/00* | (2006.01) |
| *A01D 41/127* | (2006.01) |
| *A01B 69/06* | (2006.01) |

(52) U.S. Cl.
CPC .......... *B60W 40/12* (2013.01); *A01B 69/006* (2013.01); *A01B 79/005* (2013.01); *A01D 41/127* (2013.01); *A01B 69/005* (2013.01); *B60W 2400/00* (2013.01); *B60W 2520/06* (2013.01); *B60W 2550/406* (2013.01); *B60Y 2200/22* (2013.01)

(58) Field of Classification Search
CPC .......... B60W 40/12; B60W 2550/406; B60W 2400/00; B60W 2520/06; B60Y 2200/22; A01B 69/006; A01B 69/005; A01B 70/005; A01D 41/127
See application file for complete search history.

(56) References Cited

U.S. PATENT DOCUMENTS

| | | | |
|---|---|---|---|
| 6,095,254 A | 8/2000 | Homburg | |
| 6,789,014 B1 * | 9/2004 | Rekow | G01C 21/165 180/9.38 |
| 9,750,173 B2 | 9/2017 | Dix et al. | |

(Continued)

OTHER PUBLICATIONS

European Search Report, European Patent Application Ser. No. 18208690.0, European Patent Office, dated Apr. 15, 2019, pp. 1-9.

*Primary Examiner* — Michael J Zanelli
(74) *Attorney, Agent, or Firm* — Taft Stettinius & Hollister LLP; Stephen F. Rost

(57) ABSTRACT

A method and system is disclosed for automatic detection of implement working width of an implement on a vehicle. The method includes tracking location of the vehicle; determining if the vehicle is making substantially parallel passes; if the vehicle is making substantially parallel passes the method also includes determining distances between consecutive passes; and calculating a calculated implement working width based on the distances between consecutive passes. A location sensor attached to the vehicle can be used for tracking the vehicle. Determining if the vehicle is making parallel passes can include grouping the location sensor readings into pass lines that each include sensor readings defining a single pass line; and determining if a current pass line is parallel to a prior pass line. Vehicle heading can be used for determining if pass lines are substantially parallel. Known implement working widths can be used to verify calculated implement working widths.

16 Claims, 5 Drawing Sheets

(56) References Cited

U.S. PATENT DOCUMENTS

| | | |
|---|---|---|
| 2006/0178825 A1* | 8/2006 | Eglington ............ A01B 69/008 701/410 |
| 2008/0103690 A1 | 5/2008 | Dix |
| 2008/0103694 A1 | 5/2008 | Dix et al. |
| 2008/0215203 A1 | 9/2008 | Dix et al. |
| 2011/0155401 A1 | 6/2011 | Martindale et al. |
| 2017/0112045 A1* | 4/2017 | Dix ..................... A01B 69/008 |

* cited by examiner

SYSTEM AND METHOD FOR AUTOMATIC DETECTION OF IMPLEMENT WORKING WIDTH

FIELD OF THE DISCLOSURE

The present disclosure relates to machinery with an implement, and more particularly to automatically calculating the implement working width for a machine.

BACKGROUND

Many agricultural crops are planted and harvested in parallel rows. Because of this regular pattern, a machine can make consecutive passes to accomplish planting, harvesting and other tasks. When making measurements and estimates for a field, for example acreage or yield, an important parameter for these calculations is implement working width. The implement working width is the width of the area worked (tilled, planted, harvested, etc.) by the implement on a single pass through the field. The implement working width may be different from the implement physical width, which is the actual physical width of the entire implement. For example, if a planter has marker arms, the physical width would likely be larger than the working width of the implement.

Many work machines have on-board computers with application programs that use various parameters to monitor machine usage and productivity. Implement width is one example of a parameter that can be used by one or more such application programs. In an agricultural application program when using an implement in a field, it is not uncommon for the implement working width to not be setup properly, or to not be setup at all. Some automatic methods for determining implement working width may not be effective because one or more initial parameters used to calculate implement working width are not set up properly. For example, where plant rows are automatically sensed a Global Positioning System (GPS) line may not be created or updated. When this occurs, an application program may not drive the operator to verify the working width of the implement. Without this information being setup properly; the yield, working acres, and many other measures that an application program can provide will be incorrect. Some of this data can be corrected by post-processing with manual inputs, while other data simply may be inaccurate.

It would be desirable to have a routine that detects and verifies implement working width information and takes a predetermined action depending on the differences between the detected or calculated implement working width information and any previously stored implement working width information.

SUMMARY

A method is disclosed for automatic detection of implement working width of an implement on a vehicle. The method includes tracking location of the vehicle; determining if the vehicle is making a plurality of substantially parallel passes; if the vehicle is making a plurality of substantially parallel passes the method also includes determining distances between consecutive passes of the plurality of substantially parallel passes; and calculating a calculated implement working width based on the distances between consecutive passes.

Tracking location of the vehicle can include receiving location sensor readings from a location sensor attached to the vehicle. The location sensor can be a Global Positioning System (GPS) receiver.

Determining if the vehicle is making a plurality of substantially parallel passes can include grouping the location sensor readings into a plurality of pass lines, where each of the plurality of pass lines including the location sensor readings that define a single pass line; and for each pass line of the plurality of pass lines after the first pass line, determining if a current pass line is substantially parallel to a prior pass line. The vehicle is currently traveling along the current pass line, and the prior pass line is the immediately preceding pass line on which the vehicle traveled.

Determining if a current pass line is substantially parallel to a prior pass line can include determining a vehicle heading for each pass line of the plurality of pass lines; and determining if the vehicle heading of the current pass line is within 1 degree of being 180 degrees opposite of the vehicle heading of the prior pass line.

Determining distances between consecutive passes can include determining a distance line that is substantially perpendicular to the current pass line and to the prior pass line; and calculating a perpendicular distance between the current pass line and the prior pass line along the distance line.

Calculating a calculated implement working width based on the distances between consecutive passes can include comparing the perpendicular distance between the current pass line and the prior pass line with a plurality of known implement working widths. If the perpendicular distance matches one of the known implement working widths, the method can include storing the perpendicular distance as the calculated implement working width. If the perpendicular distance does not match any of the known implement working widths, the method can include generating a notification that the perpendicular distance does not match any of the known implement working widths. If the perpendicular distance is substantially equal to a multiple, N, of one of the known implement working widths, the method can also include storing the perpendicular distance divided by N as the calculated implement working width.

The method can also include comparing the perpendicular distance to a previously stored implement working width; and if the perpendicular distance is different from the previously stored implement working width, generating a notification that the calculated implement working width does not match the previously stored implement working width. The method can also include determining if the vehicle is in a working state before tracking location of the vehicle.

A system is disclosed for automatic detection of implement working width of an implement on a vehicle, where the system includes a receiver and a processor. The receiver receives location data for the vehicle. The processor is configured to determine when the vehicle travels along a plurality of substantially parallel passes; and when the vehicle travels along a plurality of substantially parallel passes, the processor is also configured to determine a distance between consecutive passes of the plurality of substantially parallel passes; and calculate a calculated implement working width based on the distance between consecutive passes. The receiver can receive location sensor readings from a location sensor attached to the vehicle. The location sensor can be a Global Positioning System (GPS)

receiver. The location sensor can be attached to the vehicle at a center line that passes through the center of the implement.

To determine when the vehicle travels along a plurality of substantially parallel passes, the processor can be configured to group the location sensor readings into a plurality of pass lines; and for each pass line of the plurality of pass lines after the first pass line, determine if a current pass line is substantially parallel to a prior pass line. Each of the plurality of pass lines includes the location sensor readings that define a single pass line. The vehicle is currently on the current pass line, and the prior pass line is the pass line on which the vehicle traveled immediately before the current pass line. To determine if a current pass line is substantially parallel to a prior pass line, the processor can be configured to determine a vehicle heading for each pass line of the plurality of pass lines; and determine if the vehicle heading of the current pass line is within 1 degree of 180 degrees different of the vehicle heading of the prior pass line. To determine distance between consecutive passes, the processor can be configured to determine a distance line that is substantially perpendicular to the current pass line and to the prior pass line; and calculate a perpendicular distance between the current pass line and the prior pass line along the distance line. To calculate the implement working width based on the distance between passes, the processor can be configured to compare the perpendicular distance between the current pass line and the prior pass line with a plurality of known implement working widths stored in a database. If the perpendicular distance matches one of the known implement working widths, the processor can store the perpendicular distance as the calculated implement working width in a memory. If the perpendicular distance does not match any of the known implement working widths, the processor can generate a notification that the perpendicular distance does not match any of the known implement working widths. The processor can be configured to compare the perpendicular distance to a previously stored implement working width stored in the memory; and if the perpendicular distance is different from the previously stored implement working width, the processor can generate a notification that the calculated implement working width does not match the previously stored implement working width. The processor and the memory can be onboard the vehicle.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Many agricultural crops are planted and harvested in parallel rows. Because of this regular pattern, a machine can make consecutive passes to accomplish planting, harvesting and other tasks. When making measurements and estimates for a field, for example acreage or yield, an important parameter for these calculations is implement working width. The implement working width is the width of the area worked (tilled, planted, harvested, etc.) by the implement on a single pass through the field. The implement working width may be different from the implement physical width, which is the actual physical width of the entire implement. For example, if a planter has marker arms, the physical width would likely be larger than the working width of the implement.

By looking at the Global Positioning System (GPS) coordinates of two consecutive passes, the true working width of an implement can be calculated automatically. This calculated implement working width using GPS coordinates can then be verified against what is stored in an application program used by or monitoring the machine. If the calculated implement working width is not the same as a previously stored implement working width, the application program or other system can take a predetermined action. Some examples of predetermined actions that could be taken are: display a message for the operator to update the implement working width, store the calculated implement working width for future use, or automatically overwrite the previously stored implement working width with the calculated implement working width.

Figure 1:
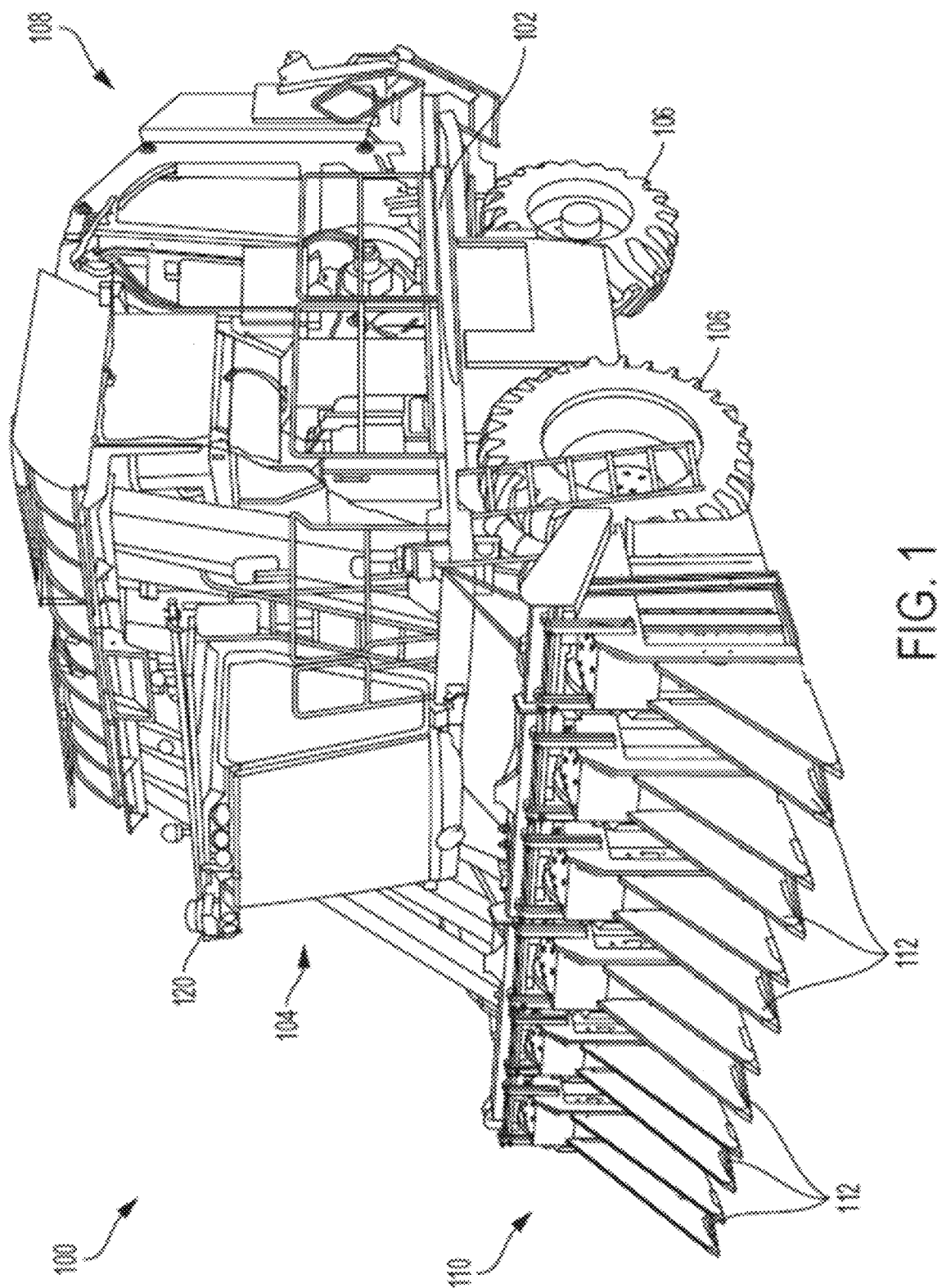
FIG. 1 illustrates a motorized work vehicle with an implement.

FIG. 1 illustrates an exemplary motorized work vehicle 100 that includes a frame 102, an operator cab 104, ground engaging wheels 106, processing equipment 108 and an implement/header assembly 110. In this example, the work vehicle 100 is a cotton picker machine. The operator cab 104, the ground engaging wheels 106, the processing equipment 108 and the implement/header assembly 110 are attached to the frame 102. The implement 110 includes a plurality of header modules 112. The wheels 106 are attached to the frame 102 in a manner that allows rotational movement relative thereto to propel the vehicle 100. An operator controls the functions of the vehicle 100 from the operator cab 104. The operator can direct the vehicle 100 to make passes in a field to enable the implement/header assembly 110 and the processing equipment 108 to process the crops or other material in the field. The vehicle 100 also includes a location sensor 120, for example a GPS receiver, to track the position of the vehicle 100.

Figure 2:
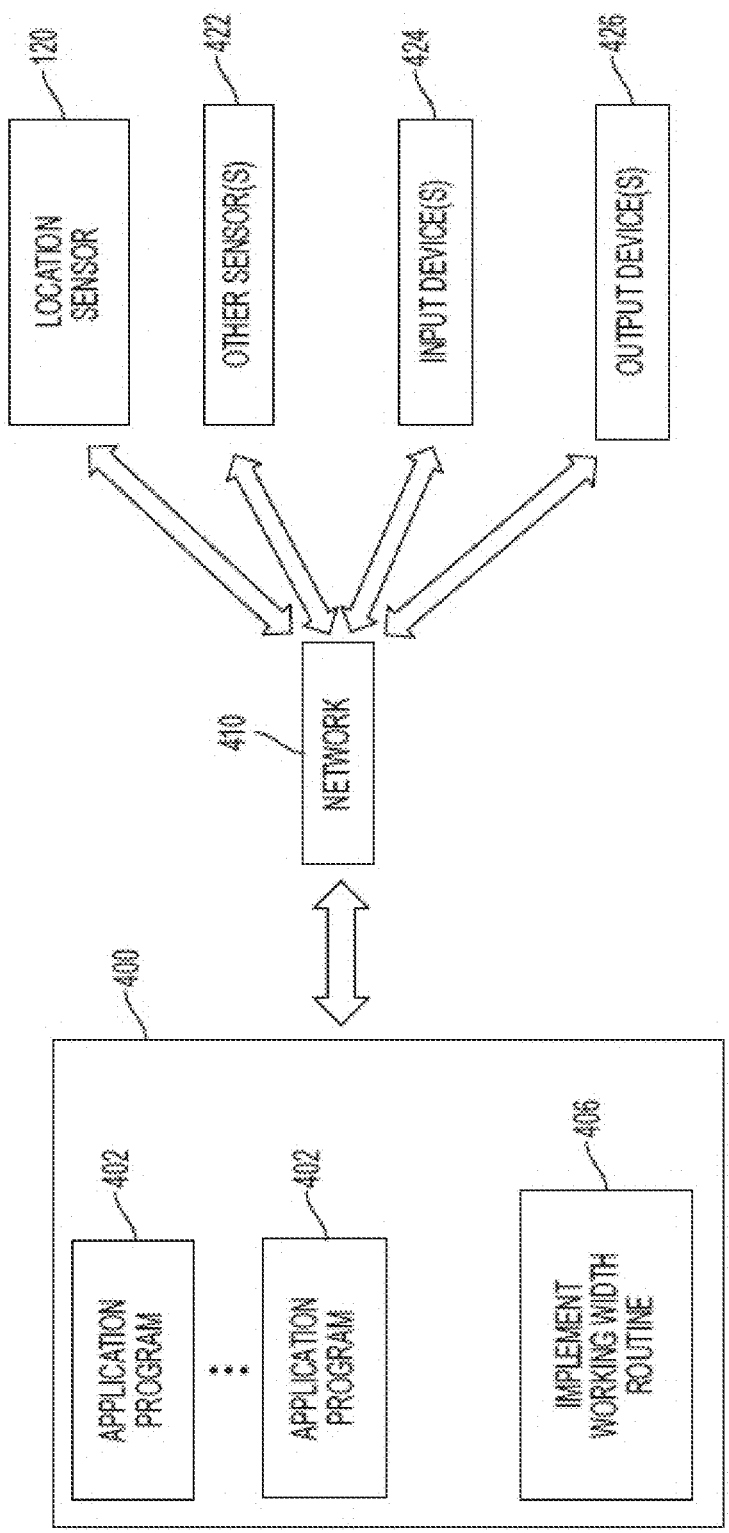
FIG. 2 illustrates an exemplary system architecture for a system that tracks and/or monitors vehicle usage.

FIG. 2 illustrates an exemplary system architecture for a system that tracks and/or monitors vehicle usage, for example usage of the vehicle 100. The exemplary system includes a computer system 400, a network 410 and one or more input and output devices. The computer system 400 includes one or more application programs 402 and an implement working width routine 406. The computer system 400 can be on-board or remote from the vehicle 100, or can include multiple computers that each can be on-board or remote from the vehicle 100. The network 410 can be a wired or wireless network on-board, or both on-board and remote from the vehicle 100. The implement working width routine 406 can be an independent routine (as shown) or can be part of one or more of the application programs 402. The input and output devices can include the location sensor 120 that provides GPS or other location information for the vehicle 100, one or more other sensor(s) 422 monitoring other vehicle parameters, one or more input device(s) 424 and one or more output device(s) 426. The input device(s) 424 can include controls in the operator cab 104, other controls on the vehicle, controls used by a remote operator, input device(s) used by an operator of the computer system 400, etc. The output device(s) 426 can include displays in the operator cab 104; alarms or other sensory indicators used to notify the vehicle operator; displays, printers or other output devices used by a remote operator; displays, printers or other output devices used by an operator of the computer system 400, etc.

Figure 3:
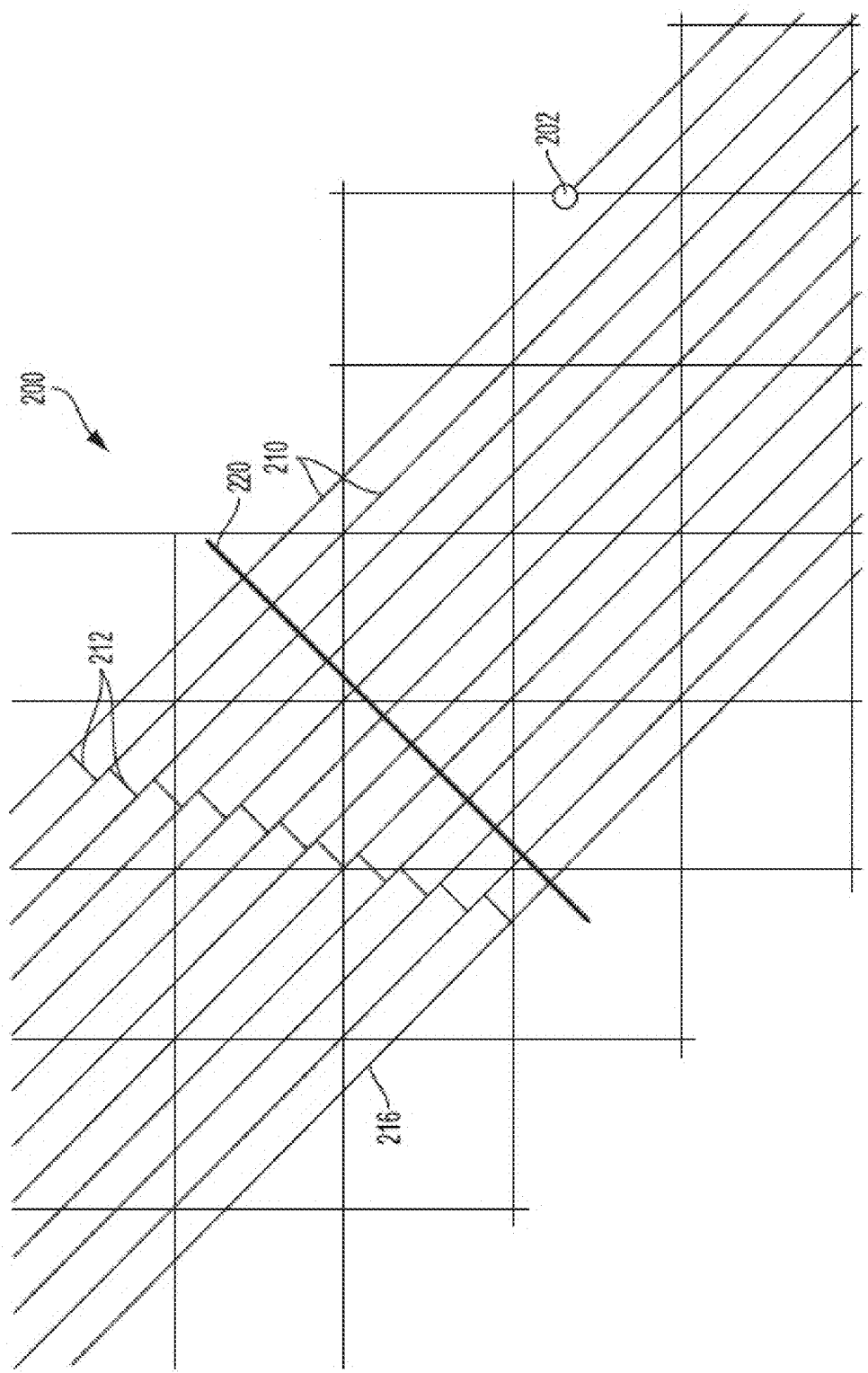
FIG. 3 illustrates a field and parallel pass lines made by a machine.

Many agricultural crops are planted and harvested in parallel rows. Because of this regular pattern, a machine can make consecutive passes to accomplish planting, harvesting and other tasks. FIG. 3 illustrates a field 200 and parallel pass lines 210 made by a machine, for example the machine 100. A point 202 indicates the current position of the machine 100 and the pass lines 210 represent the tracks that have been followed by the machine 100. The position of the machine 100 can be tracked using the location sensor 120 attached to the machine 100. Distance lines 212 between adjacent pass lines 210 indicate the working width of the implement 110 on the machine 100. When making measurements and estimates for a field, for example acreage or yield, an important parameter for these calculations is implement working width, the width of the area worked (tilled, planted, harvested, etc.) by the implement 100 on a single pass through the field 200.

An application program 402 can track and store the position 202 of the vehicle 100 as it progresses along each pass line 210 in the field 200. This tracking can be done using the readings from the location sensor 120 on the vehicle 100. The location sensor 120 can be mounted at or near the center of the machine 100 to avoid variations in the distance lines 212 as the vehicle 100 passes in opposite directions on the field 200. When mounted at the center of the vehicle 100 and the implement 110 is approximately centered on the vehicle 100, the pass lines 210 mark the path of the machine 100 with approximately half of the implement 110 on one side of each pass line 210 and approximately half of the implement 110 on the other side of each pass line 210. If the location sensor 120 is not mounted at the center of the vehicle 100 and the implement 110, an offset can be calculated to account for the distance from the center of the implement 110 on the vehicle 100 and the position of the location sensor 120.

In some operations, for example a combine in a wheat field, an application program 402 monitoring the vehicle 100 may require the operator to setup an initial GPS line, for example a first pass line 216, and then the vehicle can make subsequent pass lines 210 parallel to the first pass line 216. In other operations, for example a cotton picker in a cotton field, an application program 402 may monitor the vehicle 100 as it makes subsequent passes based on the crop rows and not necessarily on GPS readings.

The implement 110 can change by moving the header modules 112 on the implement 110. For example, a header module 112 may be removed or added to the implement 110; or the separation between header modules 112 may be changed, all of which can affect the implement working width value.

Figure 4:
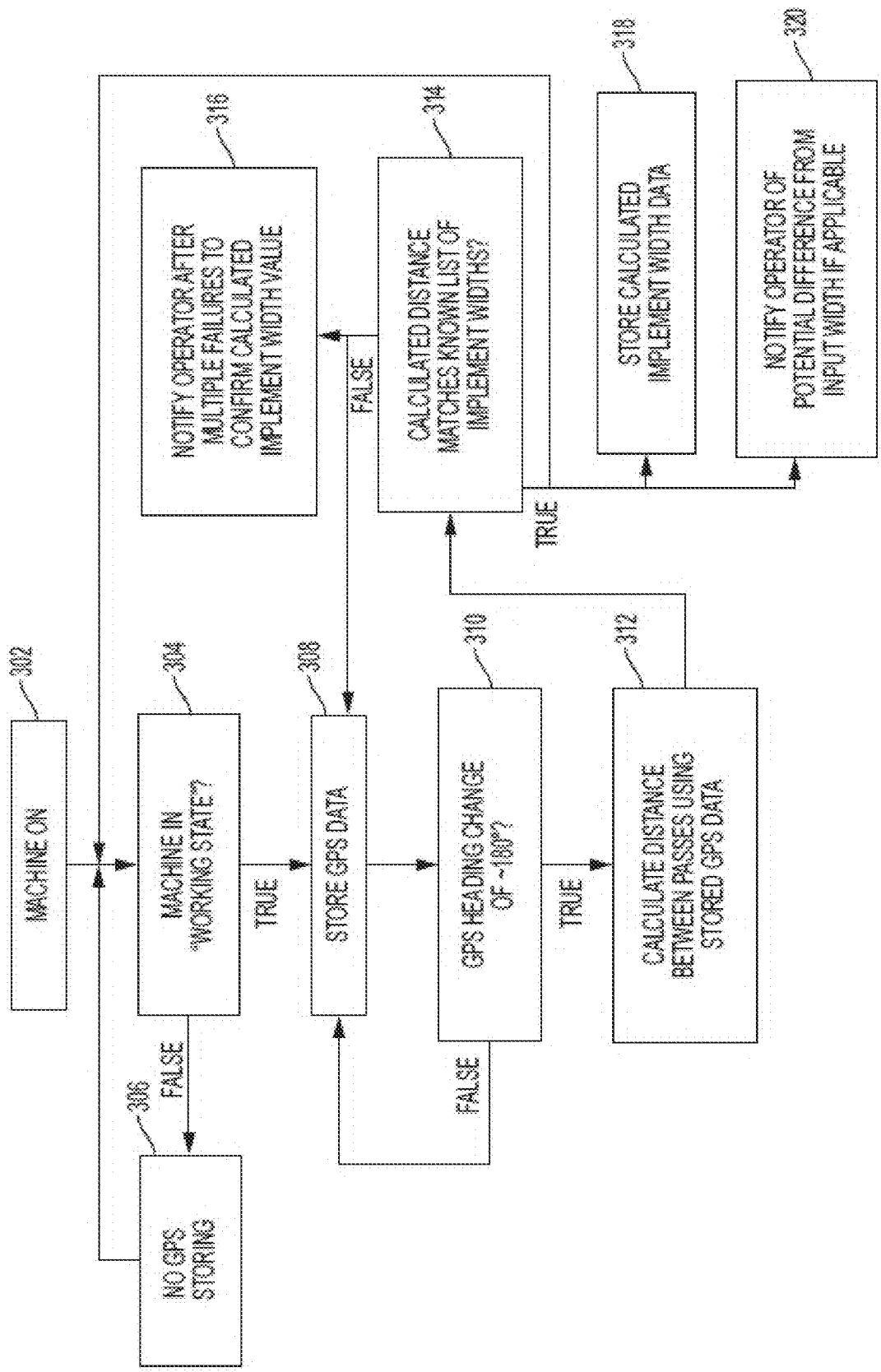
FIG. 4 illustrates an exemplary top level control diagram for an embodiment of a system for automatic detection of implement working width.

FIG. 4 illustrates an exemplary top level control diagram for an embodiment of an implement working width routine 406 for automatic detection of implement working width. The routine 406 waits at block 302 for the machine to be turned on. When the machine is turned on, control passes to block 304. At block 304, the routine checks if the machine is put into a working state, for example tilling, planting, harvesting, etc. If the machine is not in a working state, control passes to block 306 where the implement working width routine 406 does not store GPS data, and control passes back to block 304. If the machine is in a working state, control passes to block 308 where the implement working width routine 406 is activated and starts storing GPS data.

At block 308, the implement working width routine 406 stores GPS data and control passes to block 310. At block 310, the routine checks if the machine made a heading change of approximately 180 degrees since the last GPS data collection. This detects when the machine turns around to make a new pass in the opposite direction. If the machine has not turned around, control passes back to block 308 to store more GPS data for the current pass. If the machine has turned around, the system stores the GPS data and control passes to block 312. The implement working width routine 406 continues collecting and storing GPS data at blocks 308 and 312 at a desired data collection rate to track machine location, for example the routine could collect GPS data five times per second (at 5 Hertz) or some other desired rate.

At block 312, the implement working width routine 406 calculates the distance between passes using the GPS data for the new and previous passes. The routine can collect multiple points at block 312 to establish the pass line 210 and/or machine heading for the new pass. Using the pass lines 210 for the current and previous passes, the implement working width routine 406 can calculate the perpendicular distance 212 between the adjacent pass lines 210. If the heading of two passes are substantially the same or substantially 180 degrees different, for example +/−1 degree, then the passes are considered parallel. When the headings are parallel, then the perpendicular line is the opposite reciprocal of the heading. The distance between parallel passes can be calculated using the perpendicular line and the pass lines for the parallel passes. FIG. 3 also shows a multipass perpendicular 220 which covers multiple pass lines 210. The implement working width routine 406 can use the multipass perpendicular 220 to calculate and/or verify the perpendicular distance between pass lines 210 covered by the multipass perpendicular 220. After the distance between passes has been calculated, control passes from block 312 to block 314.

Figure 5:
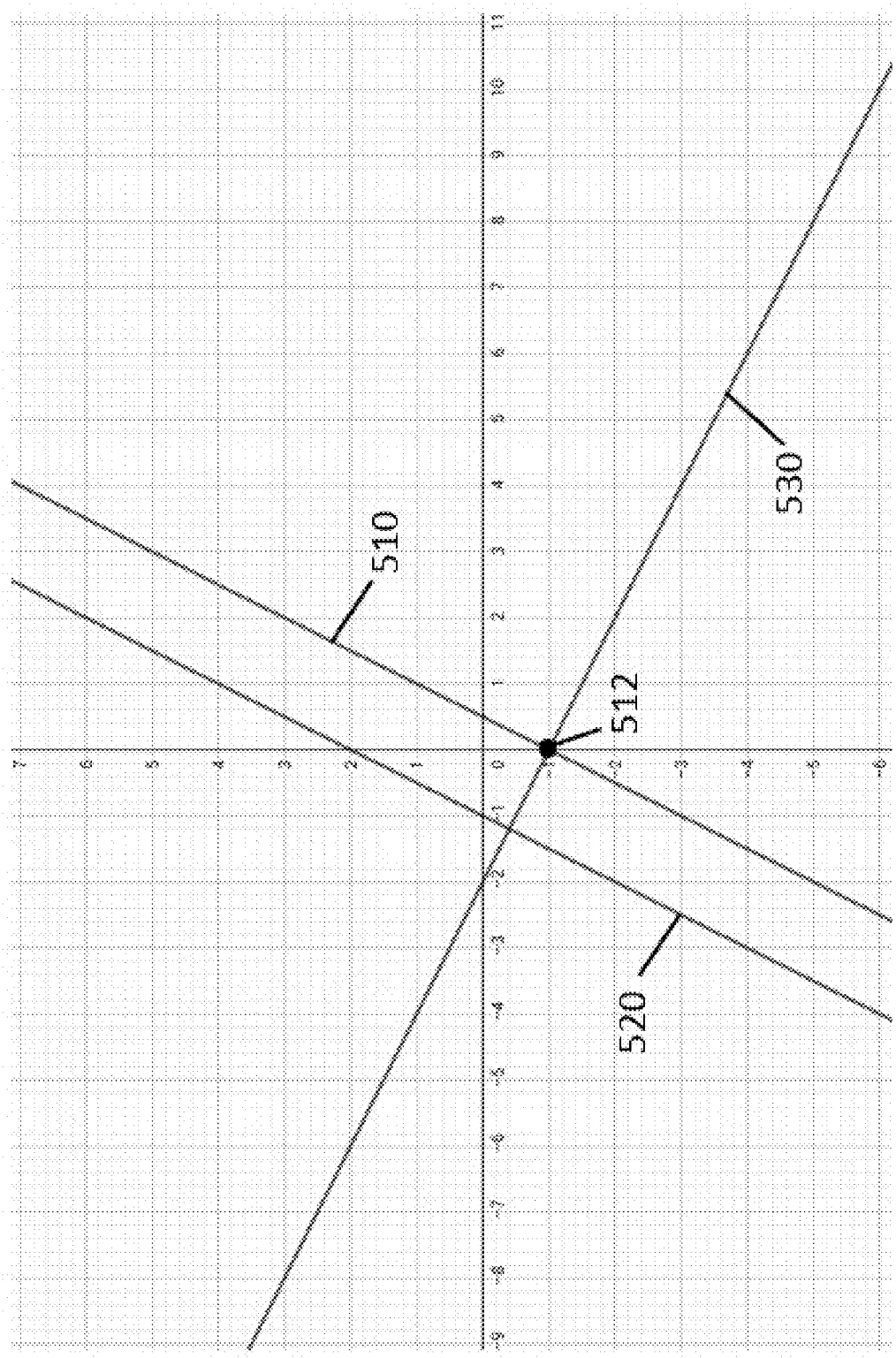
FIG. 5 illustrates a method of determining the distance between first and second pass lines using a perpendicular line.

FIG. 5 illustrates a method of determining the distance between first and second pass lines 510, 520 using a perpendicular line 530 on a Cartesian coordinate system. Each of the pass lines can be characterized mathematically. In this example, the first pass line 510 can be characterized as: $y=2x-1$; and the second pass line 520 can be characterized as: $y=2x+2$. These represent the pass lines derived from GPS or other location data. The slope of the pass lines can act as the heading of the vehicle. A pass line point 512 from the recorded location data on one of the pass lines can be chosen, for example point $(0, -1)$ can be chosen as the pass line point 512 on the first pass line 510. The opposite reciprocal of the slope of the pass lines can be used to create the perpendicular 530 through the pass line point 512. In this example, the equation of the perpendicular 530 would be y=−(½) x−1. The x-value of the intersection of the perpendicular line 530 and the second pass line 520 can be found by setting the two equations equal, −(½) x−1=2x+2, which solves to x=−1.2. The y-value of the intersection of the perpendicular line 530 and the second pass line 520 can be found by plugging the x-value into either equation, for example y=2(−1.2)+2=−0.4. Thus, the perpendicular line 530 intersects the first pass line 510 and the second pass line 520 at (0, −1) and (−1.2, −0.4), respectively. The distance, d, between these two points on the perpendicular line 530 can be found using the equation d=sqrt(($x_2$−$x_1$)²+($y_2$−$y_1$)²)=sqrt((−1.2−0)²+(−0.4−(−1))²)=sqrt(1.44+0.36)=1.34. This illustrates just one example of a method of determining the distance between pass lines, and alternative methods can be used.

At block 314, the system compares the distance between passes calculated at block 312 with known implement working widths and multiples of implement working widths. For example, if the machine is harvesting a field by itself, typically the distance between consecutive passes calculated at block 312 would be expected to equal a known implement working width. However, if three similar machines were harvesting a field cooperatively, the distance between consecutive passes calculated at block 312 could be equal to three times a known implement working width since each machine may be harvesting every third pass width.

At block 314, if the calculated distance between passes does not match a known implement working width, or reasonable multiple thereof, then block 316 is executed and control passes back to block 308 to store more GPS data. At block 316, the routine tracks if some threshold of failures has occurred to confirm the calculated implement working width against the known list of implement working widths, and notifies the operator if the failure threshold has been exceeded. The implement may have a working width not in the list of known implement working widths due to some type of modification. The system can give the user an option to permanently ignore the non-matching working width warning, and/or give the user the ability to update the list of known implement working widths, and/or give the user other options.

At block 314, if the calculated distance between passes matches a known implement working width, or reasonable multiple thereof, then blocks 318 and 320 are executed and control passes back to block 304 to check if the machine is still in the working state. At block 318, the implement working width routine 406 stores the calculated implement working width data. At block 320, the implement working width routine 406 notifies the operator of any potential differences between the calculated implement working width value and the already stored implement working width value.

The implement working width routine 406 tries to correct any bad pass width or implement working width data because if this is incorrect for a machine when working in a field, then several calculations may be affected, for example acres and yield for the field. The notifications at block 316 and/or 320, can include displaying a message on an output device 426 to update the implement working width. The implement working width routine 406 can store the calculated implement working width for future use, or automatically overwrite the previously stored implement working width with the calculated implement working width.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A method for automatic detection of implement working width of an implement on a vehicle, the method comprising:
   receiving location sensor readings from a location sensor attached to the vehicle;
   tracking location of the vehicle using the location sensor readings;
   determining if the vehicle is making a plurality of substantially parallel passes;
   if the vehicle is making a plurality of substantially parallel passes:
      determining distances between consecutive passes of the plurality of substantially parallel passes; and
      calculating a calculated implement working width based on the distances between consecutive passes;
   wherein determining if the vehicle is making a plurality of substantially parallel passes comprises:
      grouping the location sensor readings into a plurality of pass lines, each of the plurality of pass lines including the location sensor readings that define a single pass line;
      for each pass line of the plurality of pass lines after the first pass line, determining if a current pass line is substantially parallel to a prior pass line, where the vehicle is currently traveling along the current pass line and the prior pass line is the immediately preceding pass line on which the vehicle traveled.

2. The method of claim 1, wherein the location sensor is a Global Positioning System (GPS) receiver.

3. The method of claim 1, wherein determining if a current pass line is substantially parallel to a prior pass line comprises:
   determining a vehicle heading for each pass line of the plurality of pass lines;
   determining if the vehicle heading of the current pass line is within 1 degree of being 180 degrees different of the vehicle heading of the prior pass line.

4. The method of claim 1, wherein determining distances between consecutive passes comprises:
   determining a distance line that is substantially perpendicular to the current pass line and to the prior pass line; and
   calculating a perpendicular distance between the current pass line and the prior pass line along the distance line.

5. The method of claim 4, wherein calculating a calculated implement working width based on the distances between consecutive passes comprises:
   comparing the perpendicular distance between the current pass line and the prior pass line with a plurality of known implement working widths; and
   if the perpendicular distance matches one of the known implement working widths, storing the perpendicular distance as the calculated implement working width; and if the perpendicular distance does not match any of the known implement working widths, generating a notification that the perpendicular distance does not match any of the known implement working widths.

6. The method of claim 5, wherein calculating a calculated implement working width based on the distances between consecutive passes further comprises:
if the perpendicular distance is substantially equal to a multiple, N, of one of the known implement working widths, storing the perpendicular distance divided by N as the calculated implement working width.

7. The method of claim 5, further comprising:
comparing the perpendicular distance to a previously stored implement working width; and
if the perpendicular distance is different from the previously stored implement working width, generating a notification that the calculated implement working width does not match the previously stored implement working width.

8. The method of claim 5, further comprising:
determining if the vehicle is in a working state before tracking location of the vehicle.

9. A system for automatic detection of implement working width of an implement on a vehicle, the system comprising:
a receiver configured to receive location sensor readings from a location sensor attached to the vehicle;
a processor configured to determine when the vehicle travels along a plurality of substantially parallel passes; and
when the vehicle travels along a plurality of substantially parallel passes, the processor is also configured to determine a distance between consecutive passes of the plurality of substantially parallel passes; and calculate a calculated implement working width based on the distance between consecutive passes;
wherein to determine when the vehicle travels along a plurality of substantially parallel passes:
the processor is configured to group the location sensor readings into a plurality of pass lines, where each of the plurality of pass lines includes the location sensor readings that define a single pass line; and for each pass line of the plurality of pass lines after the first pass line, determine if a current pass line is substantially parallel to a prior pass line, where the vehicle is currently on the current pass line and the prior pass line is the pass line on which the vehicle traveled immediately before the current pass line.

10. The system of claim 9, wherein the location sensor is a Global Positioning System (GPS) receiver.

11. The system of claim 9, wherein the location sensor is attached to the vehicle at a center line that passes through the center of the implement.

12. The system of claim 9, wherein to determine if a current pass line is substantially parallel to a prior pass line:
the processor is configured to determine a vehicle heading for each pass line of the plurality of pass lines; and determine if the vehicle heading of the current pass line is within 1 degree of 180 degrees different of the vehicle heading of the prior pass line.

13. The system of claim 12, wherein to calculate the implement working width based on the distance between passes, the processor is configured to compare the perpendicular distance between the current pass line and the prior pass line with a plurality of known implement working widths stored in a database;
if the perpendicular distance matches one of the known implement working widths, the processor stores the perpendicular distance as the calculated implement working width in a memory; and
if the perpendicular distance does not match any of the known implement working widths, the processor generates a notification that the perpendicular distance does not match any of the known implement working widths.

14. The system of claim 13, wherein the processor is configured to compare the perpendicular distance to a previously stored implement working width stored in the memory; and if the perpendicular distance is different from the previously stored implement working width, the processor generates a notification that the calculated implement working width does not match the previously stored implement working width.

15. The system of claim 14, wherein the processor and the memory are onboard the vehicle.

16. The system of claim 9, wherein to determine distance between consecutive passes, the processor is configured to determine a distance line that is substantially perpendicular to the current pass line and to the prior pass line; and calculate a perpendicular distance between the current pass line and the prior pass line along the distance line.

* * * * *